UNITED STATES PATENT OFFICE.

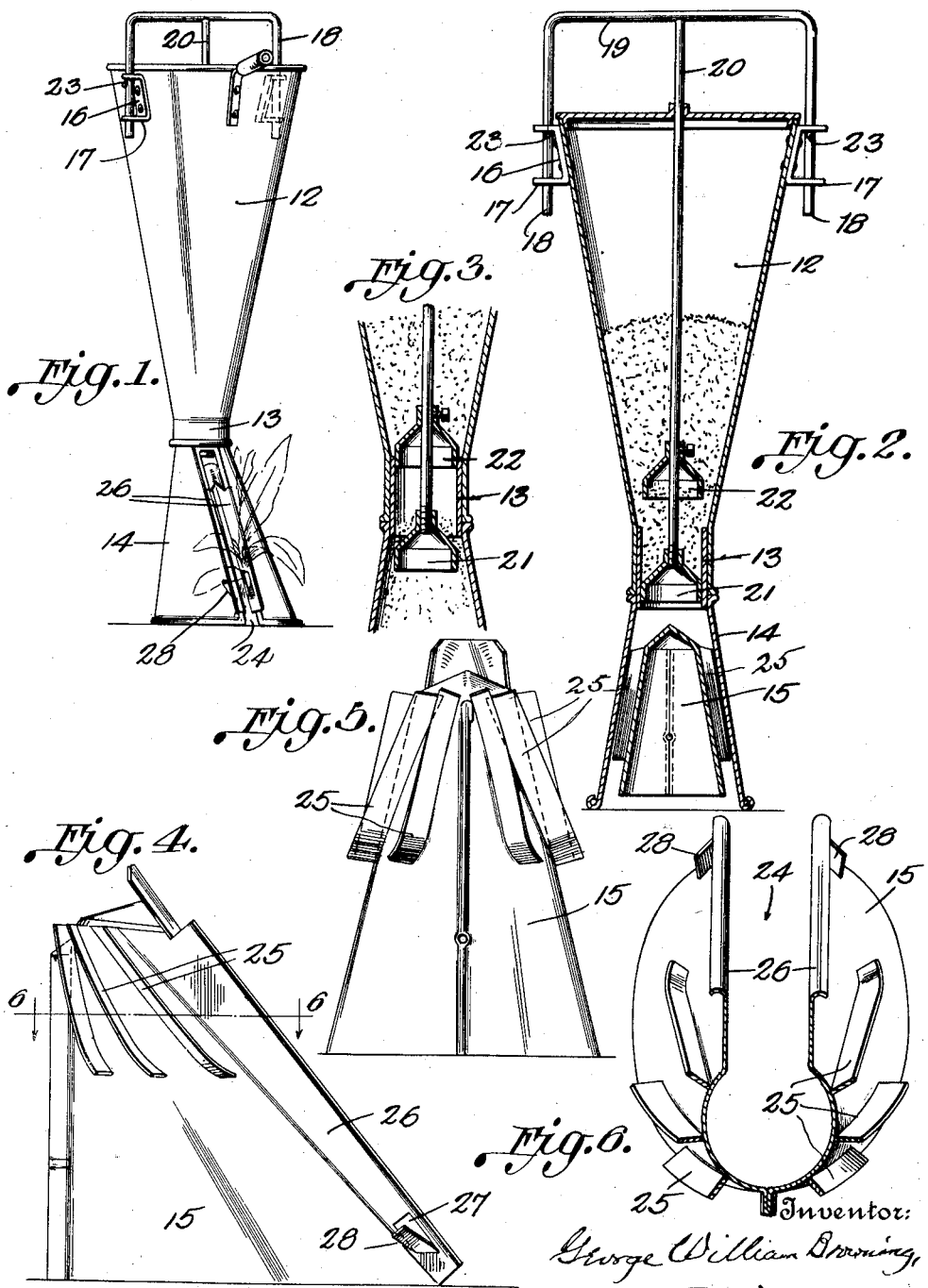

GEORGE WILLIAM BROWNING, OF CLINTON, NEW YORK.

FERTILIZER-DISTRIBUTER.

1,339,256.  Specification of Letters Patent.  Patented May 4, 1920.

Application filed July 31, 1919. Serial No. 314,528.

*To all whom it may concern:*

Be it known that I, GEORGE WILLIAM BROWNING, a citizen of the United States, residing at Clinton, in the county of Oneida and State of New York, have invented or discovered certain new and useful Improvements in Fertilizer-Distributers, of which the following is a specification, reference being had therein to the accompanying drawing.

This invention relates to certain improvements on the fertilizer distributer set forth in the patent of Charles D. Stratton, dated Sept. 2, 1919, No. 1,314,546; the principal object of the present invention being to adapt the fertilizer distributer for use in connection with growing plants of considerable size which cannot be properly fertilized by the structure set forth in the said Stratton application.

In carrying the present invention into effect the distributing cones at the lower end of the device are provided with side openings which will permit the distributer to be placed close to growing plants of considerable size and considerable portions of which may be outside of the distributer, the stems or stalks of the plants being accommodated by the said openings. To permit the distributer to be properly located with reference to the plants to be fertilized the cones are straight, or practically so, on the sides thereof opposite said openings and the inner cone, which is made somewhat shorter than the outer cone, is provided with suitably disposed wings which will carry considerable portions of the comminuted fertilizing material away from the straight sides of the cones and partly toward the open sides thereof, the parts or flanges at the open sides of the cone having openings or windows from which extend the inclined wings which will carry portions of the comminuted fertilizing material toward the open spaces of the cones and thus cause the said fertilizing material to be distributed evenly in the form of a ring around and near the roots of the plants to be fertilized.

In the accompanying drawing Figure 1 is a side elevation of a distributer embodying the present invention, showing the use thereof. Fig. 2 is a sectional elevation of the same. Fig. 3 is a detail sectional view of a part of the distributer, showing the valves in different positions than in Fig. 2. Figs. 4 and 5 are detail views of the inner distributing cone, and Fig. 6 is a section of the same on line 6—6, Fig. 4 looking down.

The improved distributer comprises a body portion or hopper 12 for holding the comminuted fertilizing material, said hopper being preferably in the form of a cone as shown. At the lower end of the body or hopper 12 is a tubular part or tube 13, and extending downward from said tubular part 13 is an outer conical distributing member 14 within which is an inner conical distributing member 15.

Fixed to the opposite sides of the upper portion of the body or member 12 are brackets 16 having ears 17, said ears having suitable openings for the passage of depending portions 18 of a handle 19. Attached to the handle 19 is a rod 20 which carries two valves 21 and 22 having a close sliding fit in the tubular portion or tube 13, said valves 21 and 22 being properly spaced apart so that when the lower valve 21 is lifted it will close the opening at the lower end of the body or hopper 12, and when the handle is depressed and the valves are moved downward a measured portion of the fertilizing material will be carried into the tube 13 and will pass downward around the said valve 21 when the latter is in the lowered position shown in Fig. 3; and when said valve 21 is in such lowered position the opening at the lower portion of the body or hopper 12 will be closed by the valve 22.

The depending portions 18 of the handle 19 are provided with pins 23 working between the ears 17, said pins serving as stops to limit the movements of said handle in both directions, and consequently controlling the movements of the valves 21 and 22.

The conical distributing members 14 and 15 are preferably formed nearly straight or vertical at one side and are flared out considerably at their opposite sides where they are provided with openings 24 adapted to receive the stems of plants to be fertilized. To enable the comminuted fertilizing material to be distributed evenly in the form of a ring around the plant, near the roots thereof, the inner conical distributing member 15 is provided with a series of wings 25 which are inclined away from the straight or vertical sides of its conical member; and to enable the fertilizing material to be laid in a complete ring at the open portions of the conical distributing members, the inner distributing member 15 comprises flanges 26 at the sides of said openings 24 and which flanges are provided with openings 27 from the bottoms of which extend upwardly inclined wings 28 which will catch portions of the falling comminuted fertilizing material and direct it through the said openings 26 so as to complete the ring of distributed fertilizer around the base of the plant to be fertilized.

From the foregoing it will be understood that the present invention provides a convenient means for distributing comminuted fertilizing material around a growing plant which would be too large to be properly fertilized by a distributer not having openings at one side to receive the stalks or portions of the plant to be fertilized.

Having thus described my invention I claim and desire to secure by Letters Patent:

1. In a fertilizer distributer, the combination with a body or hopper adapted to receive fertilizing material, of inner and outer cones connected to the lower part of said body or hopper, said cones having side openings, valves for controlling the supply of fertilizing material from said body or hopper to said cones, and means for operating said valves.

2. In a fertilizer distributer, the combination with a body or hopper adapted to receive fertilizing material, of inner and outer cones connected to the lower part of said body or hopper, said cones being substantially straight or vertical at one side and having openings at their opposite sides, valves for controlling the supply of fertilizing material from said body or hopper to said cones, and means for operating said valves.

3. In a fertilizer distributer, the combination with a body or hopper adapted to receive fertilizing material, of inner and outer cones connected to the lower part of said body or hopper, said cones having side openings, valves for controlling the supply of fertilizing material from said body or hopper to said cones, and means for operating said valves, said inner cone having inclined wings and flanges at the sides of said openings, said flanges having openings and inclined wings to direct falling fertilizing material through said openings in said flanges.

4. In a fertilizer distributer, the combination with a body or hopper adapted to receive fertilizing material, of inner and outer cones connected to the lower part of said body or hopper, said cones being substantially straight or vertical at one side and having openings at their opposite sides, valves for controlling the supply of fertilizing material from said body or hopper to said cones, and means for operating said valves, said inner cone having inclined wings and flanges at the sides of said openings, said flanges having openings and inclined wings to direct falling fertilizing material through said openings in said flanges.

5. In a fertilizer distributer, the combination with a conical body or hopper adapted to receive fertilizing material, brackets attached to the upper part of said body or hopper and having ears, an operating handle having depending parts adapted to slide through said ears, stops on said depending parts to engage said ears to limit the movements of said handle, valves operatively connected with said handle and serving to properly dispense the fertilizing material from said body or hopper, and conical distributing members below said body or hopper and coöperating with said valves.

In testimony whereof I affix my signature.

GEORGE WILLIAM BROWNING.